(12) United States Patent
Noda et al.

(10) Patent No.: US 8,920,968 B2
(45) Date of Patent: Dec. 30, 2014

(54) OVERLAYING MEMBER AND FILM-COVERED ELECTRICAL DEVICE

(75) Inventors: Shunji Noda, Sagamihara (JP); Masatomo Mizuta, Sagamihara (JP)

(73) Assignee: NEC Corporation, Tokyo (JP)

( * ) Notice: Subject to any disclaimer, the term of this patent is extended or adjusted under 35 U.S.C. 154(b) by 442 days.

(21) Appl. No.: 12/920,289

(22) PCT Filed: Mar. 9, 2009

(86) PCT No.: PCT/JP2009/054378
§ 371 (c)(1),
(2), (4) Date: Aug. 30, 2010

(87) PCT Pub. No.: WO2009/113470
PCT Pub. Date: Sep. 17, 2009

(65) Prior Publication Data
US 2011/0003198 A1    Jan. 6, 2011

(30) Foreign Application Priority Data
Mar. 14, 2008 (JP) .................................. 2008-066478

(51) Int. Cl.
  *H01M 2/08* (2006.01)
  *H01M 10/04* (2006.01)
  *H01G 9/08* (2006.01)
  *H01M 2/02* (2006.01)

(52) U.S. Cl.
  CPC ............. *H01M 10/0436* (2013.01); *H01G 9/08* (2013.01); *H01M 2/021* (2013.01); *H01M 2/0267* (2013.01); *H01M 2/0275* (2013.01); *H01M 2/0287* (2013.01)
  USPC ............. 429/185; 429/82; 429/163; 429/176; 429/136

(58) Field of Classification Search
  USPC .......................... 429/82, 163, 176, 185, 136
  See application file for complete search history.

(56) References Cited

U.S. PATENT DOCUMENTS

| | | | | |
|---|---|---|---|---|
| 6,632,538 B1* | 10/2003 | Yamazaki et al. | ............ | 428/461 |
| 2003/0228515 A1* | 12/2003 | Woehrle et al. | ............... | 429/160 |
| 2007/0096688 A1 | 5/2007 | Suzuki et al. | | |
| 2007/0207378 A1* | 9/2007 | Mizuta | ........................ | 429/176 |
| 2007/0231685 A1 | 10/2007 | Takeuchi et al. | | |

FOREIGN PATENT DOCUMENTS

JP    10-241744 A    9/1998
JP    11-265693 A    9/1999
(Continued)

OTHER PUBLICATIONS

Office Action issued Aug. 6, 2013, by the Japanese Foreign Patent Office in counterpart Japanese Application No. 2010-502796.

*Primary Examiner* — Patrick Ryan
*Assistant Examiner* — Alex Usyatinsky
(74) *Attorney, Agent, or Firm* — Sughrue Mion, PLLC

(57) ABSTRACT

A battery element (2) includes a positive electrode and a negative electrode stacked via a separator. A collector portion (3) is formed by collectively bonding each of positive electrode plates and negative electrode plates which extend outward from this stacked region. Laminated films (5, 6) are obtained by laminating a thermally-fusible resin layer and a metal layer, and by sealing the battery element (2) and electrolyte by thermally fusing sealing portion (8) at a peripheral edge. A tab (4) is connected to collector portion (3) and extends outward from the laminated films (5, 6). An overlaying member (7) includes a protective region (7d) which protects the laminated films (5, 6) from corners (2c) of the battery element (2), corners (3c) of the collector portion (3) and corners (4c) of the tab (4), and a communication portion (7c) through which electrolyte can pass.

12 Claims, 8 Drawing Sheets

(56) References Cited

FOREIGN PATENT DOCUMENTS

| | | |
|---|---|---|
| JP | 2000-173641 A | 6/2000 |
| JP | 2000-311717 A | 11/2000 |
| JP | 2001-283798 A | 10/2001 |
| JP | 2002-056835 A | 2/2002 |
| JP | 2005-317312 A | 11/2005 |
| WO | 2005/045983 A1 | 5/2005 |
| WO | 2005/086258 A1 | 9/2005 |

* cited by examiner

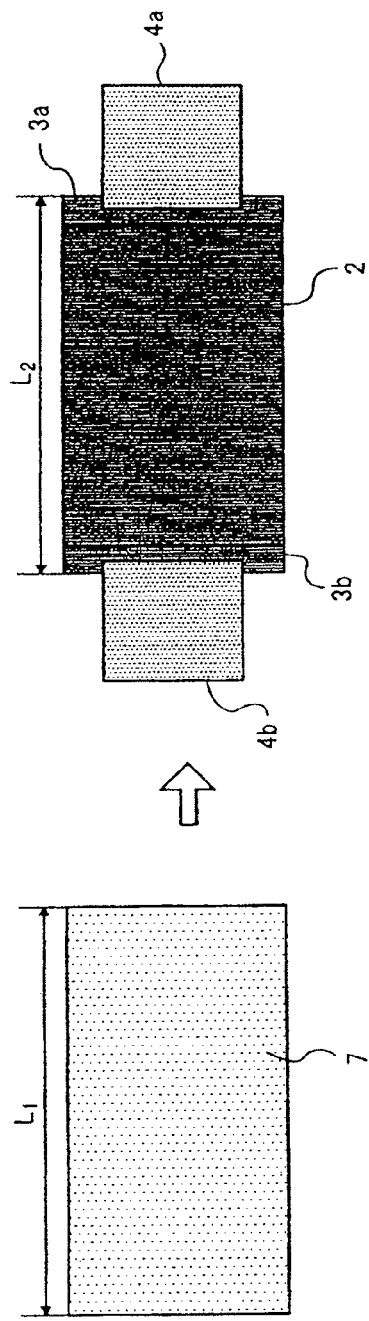

OVERLAYING MEMBER AND FILM-COVERED ELECTRICAL DEVICE

TECHNICAL FIELD

The present invention relates to a film-covered electrical device which is such that an electrical device element represented by a battery and a capacitor is housed in a covering film. More particularly, the invention relates to an overlaying member which is overlaid on a battery element of a film-covered electrical device.

BACKGROUND ART

In recent years, batteries as power sources of mobile devices and the like have been strongly required to have light weight designs and thin designs. Therefore, also for covering materials for batteries, those using metal thin films or laminated films obtained by laminating a metal thin film and a thermally-fusible resin film have come to be used in place of conventional metal cans having limits in terms of light weight designs and thin designs, because laminated films are capable of accommodating lighter weight designs, and thinner designs and accommodating free shapes compared to metal cans.

Representative examples of a laminated film used as a covering material for a battery include a three-layer laminated film in which a thermally-fusible resin film as a near shield layer is laminated on one surface of an aluminum thin film, which is a metal thin film, and a protective film is laminated on the other surface.

In a film-covered battery using a laminated film as a covering material, a battery element in which a positive electrode and a negative electrode are stacked via a separator is enclosed with a laminated film, with thermally-fusible region films opposed to each other, and the laminated film is thermally fused along the circumference of the battery element, whereby the battery element is hermetically sealed (hereinafter hermetical sealing is simply called sealing). The battery element has a collector portion formed by collectively bonding each of the positive electrode plates and negative electrode plates, which extend outward from a stacked region where a plurality of positive electrode plates and a plurality of negative electrode plates are stacked in an opposed condition.

In order to draw out the positive electrode and negative electrode of the battery element to the outside of the laminated film, a tab is connected to a terminal part of the collector portion of the positive electrode and the negative electrode. These tabs are such that a part thereof extends outward from the laminated film.

The battery element is such that the positive electrode and the negative electrode are stacked via a separator. It is necessary to ensure that the positive electrode and the negative electrode do not come apart from each other during the manufacturing process. If, after completing assembly of a battery, the positive electrode, the negative electrode and the separator become displaced from each other in the interior of the battery, then it becomes impossible to obtain the prescribed characteristics.

Similar problems occur also in a wound-type battery element. In the case of a battery element wound in a spiral form, the loosening of a winding stop makes the distance between electrodes nonuniform and induces the deterioration of battery performance. Therefore, in JP10-241744, fixing means for a winding stop is disposed on the side surface of an electrode body parallel to the winding axis of the electrode body, on a top surface of the electrode body or/and a bottom surface of the electrode body. This fixing means has pores. The pores are provided so as not to prevent the movement of an electrolyte and gas.

On the other hand, also in a stacked-type battery element, a battery using a film which wraps a battery element is disclosed in JP11-265693. The battery disclosed in JP11-265693 uses a solid electrolyte. This solid electrolyte pollutes a sealing portion of the laminated film in the manufacturing stage and, therefore, the reliability of the sealing portion becomes very low. Therefore, in order to prevent this, the battery element is wrapped with a synthetic resin film. For this reason, no pore can be formed in the synthetic resin film disclosed in JP11-265693. If pores are formed, solid electrolyte leaks from the pores and pollutes the sealing portion, with the result that the effect of wrapping with a film cannot be obtained.

In addition, in order to prevent a stacked-type battery element from coming apart, as shown in FIG. 1A, a method which involves fixing with fixing tape is sometimes adopted. In FIG. 1A, areas in the vicinity of four corners of a battery element are fixed with four pieces of fixing tape.

In the manufacturing of a stacked-type film-covered battery, it is necessary to ensure that the battery element does not come apart, and as well, the insulating properties of a collector portion and tabs pose a problem.

Fixing means 10 of JP10-241744 is provided between lead terminals 5, 5' and hence it is impossible to achieve insulation between areas in the vicinity of lead terminals 5, 5' as well as corners of the electrode body not covered with fixing means 10 and a battery container by using fixing means 10.

It is stated that it is preferred that polyester film 5 of JP11-265693 be completely wrapped with a synthetic resin film on its at least four surfaces except the surface where a terminal portion is present, preferably on its five surfaces, and for the length of the film, it is stated that this length is 150 to 300% of the length of a peripheral edge portion of the battery element. In JP11-265693, it is stated that wrapping with a synthetic resin film includes wrapping with a synthetic resin film having a larger width than the battery element or folding back a protruding synthetic resin film inside. However, it can be said that in the film of JP11-265693, no consideration is given to overlaying with a synthetic resin film for the surface where a terminal portion is present. That is, it can be said that in the film of JP11-265693, no consideration is given to the insulating properties in the terminal portion.

The present inventors have developed a sack-shaped member for improving the insulating properties between a collector portion or a tab and a covering film. By covering the collector portion and the tab with the sack-shaped member, it is possible to easily achieve the improvement of the insulating properties of these parts (pamphlet of International Publication No. 2005-086258).

DISCLOSURE OF THE INVENTION

However, it is necessary that the sack-shaped member have a shape fitted to the shape of the collector portion. Because, in addition, it is also necessary to form an opening through which the tab is inserted, the shape of the sack-shaped member becomes complicated. Sack-shaped member 109 shown in FIG. 1A covers only the area in the vicinity of the collector portion and, therefore, the sack-shaped member does not have the function of preventing the battery element from coming apart. Also, in the case of sack-shaped member 109, it is necessary that sack-shaped member 109 be provided in quantities of two because of separate installation on the positive electrode side and the negative electrode side, with the result that the number of parts increases and that the number of steps for installation also increases.

In the case of the manufacture of a stacked-type film-covered battery, there is a further problem as described below. This problem will be described with the aid of the sectional views along Line C-C of FIG. 1A, which are shown in FIGS. 1B and 1C.

As shown in FIG. 1B, a film-covered battery has clearance L3 between battery element 102 and sealing portion 108. The reason for this is as follows.

When sealing portion 108 is heated by use of a heater, the heat is conducted to laminated films 105, 106 and the resin softens in region D in the vicinity of the sealing portion. If clearance L3 is reduced as shown in FIG. 1C, corners 102c of battery element 102 strike against laminated films 105, 106 which have softened, damaging laminated films 105, 106. When corners 102c break through the thermally-fusible resin layers of laminated films 105, 106 and reach the metal layers, the metal layers become exposed to the interior of the battery, bringing about poor insulation.

Therefore, in order to avoid this, it is necessary that clearance L3 of at least 3 mm be present between sealing portion 108 and battery element 102. However, this clearance provides an obstacle to an improvement in capacity density.

Such problems with insulation can occur not only in the stacked region of battery element 102, but also in the collector portion and tab which are made of metal plates. The reason for this is as follows. That is, because these are formed by cutting metal plates, the corners on cut surfaces have shapes which are apt to damage the laminated films.

Therefore, the present invention has an object to provide an overlaying member which fixes an electrical device element, protects the covering film not only from the electrical device element, but also from a tab, and improves the electrical insulating properties of the covering film, and a file covered film-covered electrical device in which this overlaying member is used.

To achieve the above-described object, the overlaying member of the present invention which is used in a film-covered electrical device includes: an electrical device element, which includes a stacked region where a plurality of positive electrode plates which are electrodes, and a plurality of negative electrode plates which are electrodes, are stacked in an opposed condition, and which includes a collector region which is formed by collectively bonding each of the positive electrode plates and negative electrode plates, which extend outward from the stacked region; a covering film in which at least a thermally-fusible resin layer and a metal layer are stacked and which encloses the electrical device element, with the thermally-fusible resin layer disposed inside, and which seals the electrical device element and an electrolyte by thermally fusing a sealing portion at a peripheral edge; and a tab which is connected to the collector portion and extends outward from the covering film, includes a protective region which covers corners of the electrical device element and corners of the tab, and includes a communication portion through which the electrolyte can pass.

The film-covered electrical device of the present invention includes: an electrical device element, which includes a collector region which is formed by collectively bonding each of the positive electrode plates and negative electrode plates, which extend outward from a stacked region where a plurality of positive electrode plates which are electrodes, and a plurality of negative electrode plates which are electrodes, are stacked in an opposed condition; a covering film in which at least a thermally-fusible resin layer and a metal layer are stacked and which encloses the electrical device element, with the thermally-fusible resin layer disposed inside, and which seals the electrical device element and an electrolyte by thermally fusing a sealing portion at a peripheral edge; a tab which is connected to the collector portion and extends outward from the covering film; and the overlaying member of the present invention.

The film-covered electrical device of the present invention includes: an electrical device element, which includes a stacked region where a plurality of positive electrode plates which are electrodes, and a plurality of negative electrode plates which are electrodes are stacked in an opposed condition, and which includes a collector region which is formed by collectively bonding each of the positive electrode plates and negative electrode plates, which extend outward from the stacked region; a covering film in which at least a thermally-fusible resin layer and a metal layer are stacked and which encloses the electrical device element, with the thermally-fusible resin layer disposed inside, and seals the electrical device element and an electrolyte by thermally fusing a sealing portion at a peripheral edge; a tab which is connected to the collector portion and extends outward from the covering film; and the overlaying member of the present invention. In this film-covered electrical device, the covering film, which is one sheet of film material folded twofold, sandwiches the electrical device element overlaid with the overlaying member, and seals the electrical device by thermally fusing three open sides. The overlaying member, which is one sheet of film material folded twofold, sandwiches at least the electrical device element and the tab, and an open portion opposed to a bent portion of the overlaying member is positioned on the fold line side of the covering film.

According to the overlaying member of this invention, it is possible to fix the electrical device element, and to protect the covering film not only from the electrical device element but also from the tabs, and to improve the electrical insulating properties of the covering film.

BRIEF DESCRIPTION OF THE DRAWINGS

FIG. 2A is a plan view showing an overlaying member in a first exemplary embodiment before it is overlaid on a battery element of this exemplary embodiment and the battery element;

BEST MODE FOR CARRYING OUT THE INVENTION

First Exemplary Embodiment

Next, exemplary embodiments will be described with reference to the drawings.

Figure 1A:
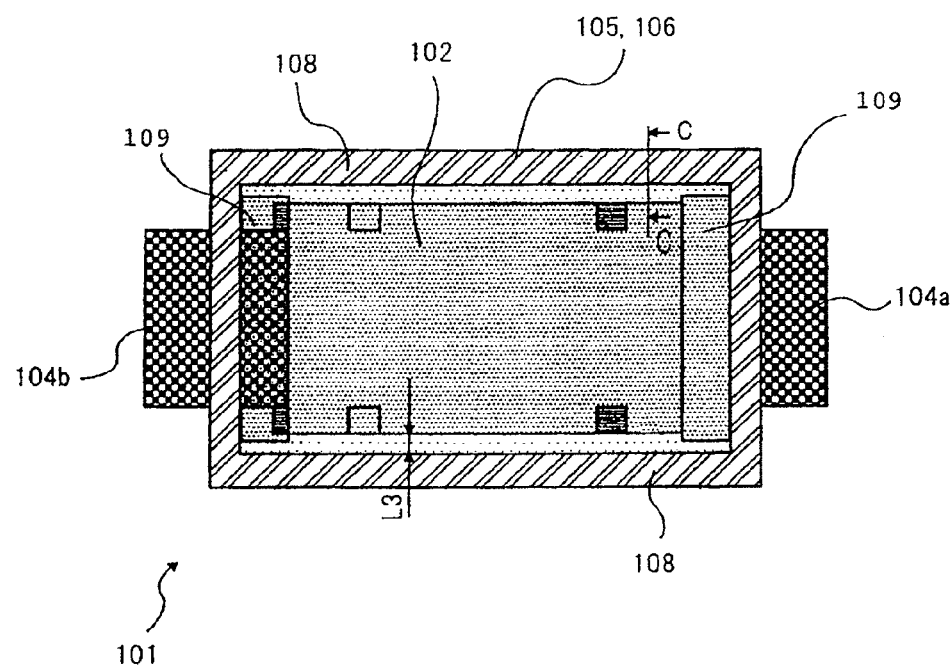
FIG. 1A is a diagram showing an example of a battery element fixing method in a film-covered battery of related to an exemplary embodiment.
Figure 2B:
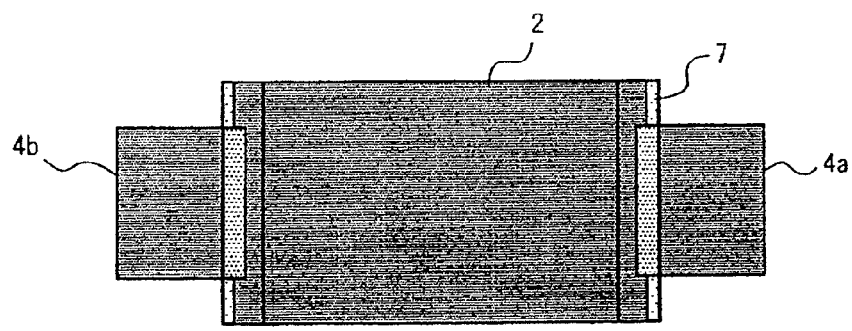
FIG. 2B is a transmission plan view showing how the overlaying member in the first exemplary embodiment looks like when it is overlaid on the battery element.
Figure 2C:
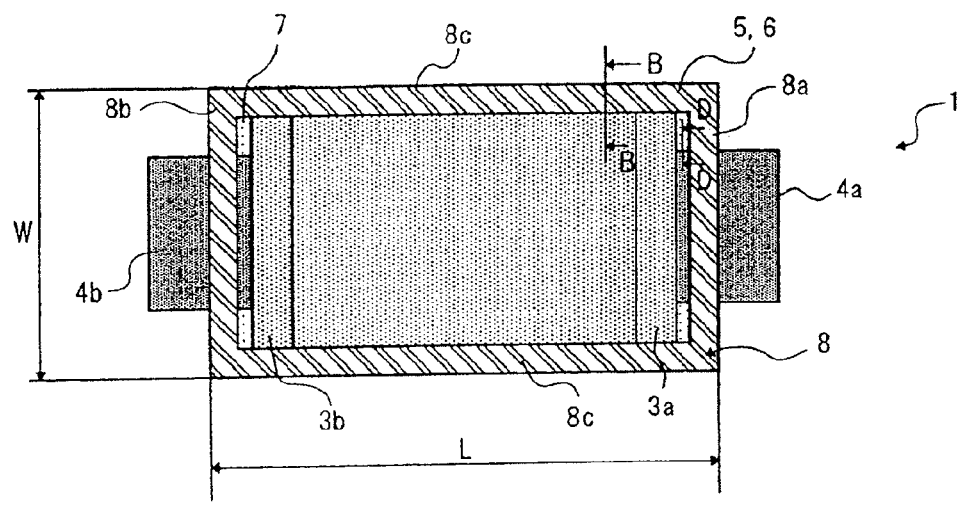
FIG. 2C is a transmission plan view of a film-covered battery in which the battery element overlaid with the overlaying member in the first exemplary embodiment is sealed with a laminated film.
Figure 2D:
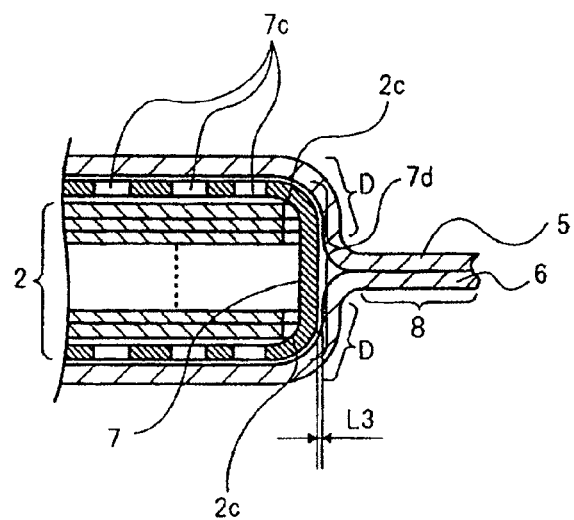
FIG. 2D is a partial sectional view along Line A-A shown in FIG. 2C.
Figure 2E:
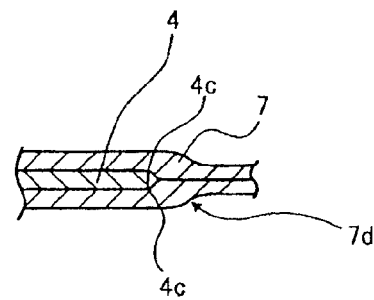
FIG. 2E is a partial sectional view along Line D-D shown in FIG. 2C.

FIG. 2A is a plan view showing an overlaying member before it is overlaid on a battery element, and the battery element. FIG. 2B is a transmission plan view showing how the overlaying member looks like when it is overlaid on the battery element. FIG. 2C is a transmission plan view of a film-covered battery in which the battery element overlaid with the overlaying member is sealed with a laminated film. FIG. 2D is a partial sectional view along Line B-B shown in FIG. 1A. FIG. 2E is a partial sectional view along Line D-D shown in FIG. 2C.

Figure 3A:
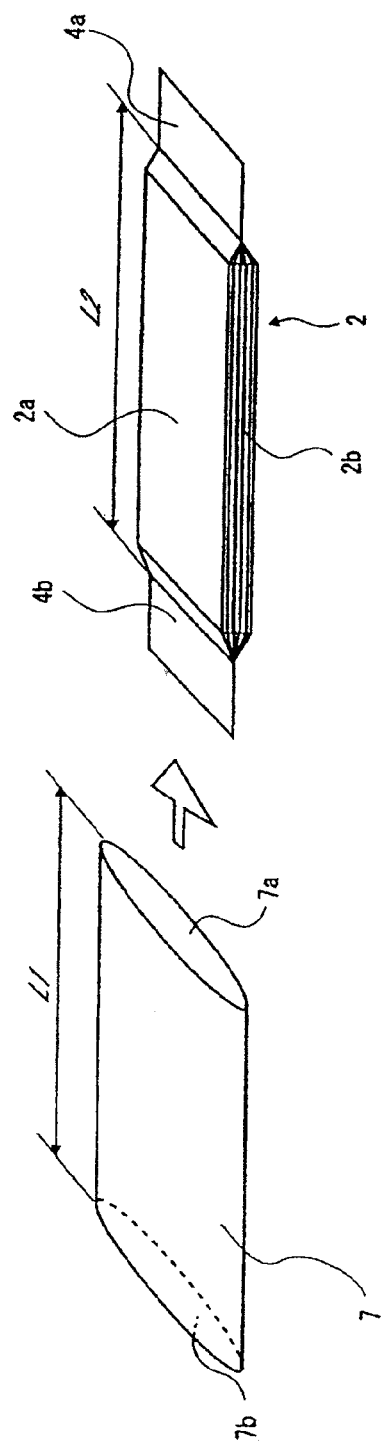
FIG. 3A is a perspective view of an overlaying member in the first exemplary embodiment before it is overlaid on a battery element and the battery element.
Figure 3B:
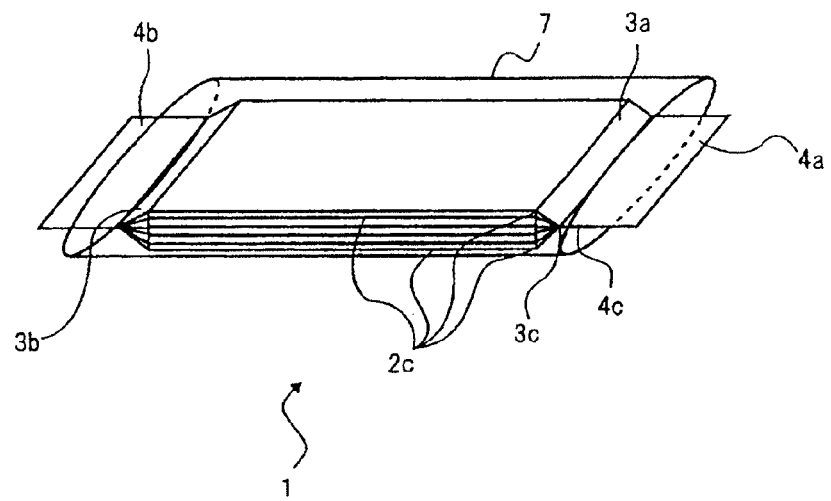
FIG. 3B is a transmission perspective view showing how the overlaying member in the first exemplary embodiment looks like when it is overlaid on the battery element.

FIG. 3A is a perspective view of an overlaying member before it is overlaid on a battery element and the battery element. FIG. 3B is a transmission perspective view showing how the overlaying member looks like when it is overlaid on the battery element.

Film-covered battery 1 comprises battery element 2, positive electrode collector portion 3a and negative electrode collector portion 3b provided in battery element 2, a covering material composed of two laminated films 5, 6 which houses battery element 2 along with an electrolyte, positive electrode tab 4a connected to positive electrode collector portion 3a, negative electrode tab connected to negative electrode collector portion 3b, and overlaying member 7.

For the preferable sizes of film-covered battery 1, length L is in the range of 100 mm to 500 mm, width W is in the range of 100 mm to 500 mm, and thickness is in the range of 1 to 15 mm. More preferably, length L is in the range of 200 mm to 300 mm, width W is in the range of 100 to 200 mm, and thickness is in the range of 2 to 10 mm. The capacity of film-covered battery 1 is preferably in the range of 1.5 Ah to 50 Ah, and more preferably in the range of 3 Ah to 10 Ah.

Battery element 2 is composed by alternately stacking a plurality of positive electrode plates and a plurality of negative electrode plates via separators. Porous films formed from thermoplastic resin, such as polyolefin, and the like are used as the separators.

In each of the positive electrode plates, a positive electrode is applied to aluminum foil and in the negative electrode plates, a negative electrode is applied to copper foil. The extending portion extends outward from the stacked region, and no electrode material is applied. The extending portions of the positive electrode plates are collectively ultrasonic welded together, whereby positive electrode collector portion 3a, which is a relay portion, is formed. Similarly, the extending portions of the negative electrode plates are collectively ultrasonic welded, whereby positive electrode collector portion 3a and negative electrode collector portion 3b, which are relay portions, are formed. At the same time, the connection of positive electrode tab 4a to positive electrode collector portion 3a and the connection of negative electrode tab 4b to negative electrode collector portion 3b are also performed by ultrasonic welding. In the present description, positive electrode collector portion 3a and negative electrode collector portion 3b may sometimes be collectively called collector portion 3, and positive electrode tab 4a and negative electrode tab 4b may sometimes be collectively called tab 4.

The covering material is formed from two laminated films 5, 6 which enclose battery element 2 by sandwiching battery element 2 from both sides of the thickness direction of battery element 2. Each of laminated films 5, 6 is formed by laminating a thermally-fusible resin layer having thermal fusion properties, a metal layer and a protective layer. Laminated films 5, 6 are such that battery element 2 is sealed by the thermal fusing of sealing portion 8, which provides thermally-fused portions of laminated films 5, 6 so that a thermally-fusible resin layer made of PP (polypropylene) faces the inner side.

Films used in the film-covered battery of the above-described type can be used as laminated films 5, 6 so long as they can seal battery element 2 so that the electrolyte does not leak, and in general, laminated films in which a metal thin film layer and a thermally-fusible resin layer are laminated are used. For example, films in which a thermally-fusible resin layer whose thickness is 3 μm to 200 μm stuck to metal foil whose thickness is 10 μm to 100 μm can be used as the laminated films of the above-described type. Al, Ti, Ti-based alloys, Fe, stainless steels, Mg-based alloys and the like can be used as the metal foil, i.e., the metal layer. Polypropylene, polyethylene, acid denatured substances of polypropylene and polyethylene, polyphenylene sulfides, polyester, such as polyethylene terephthalate, polyamide, ethylene-vinyl acetate copolymers and the like, can be used as the thermally-fusible resin, i.e., the thermally-fusible resin layer. Nylon and the like are suitable as the protective layer.

Overlaying member 7 is a cylindrical film comprising protective region 7d and communication portion 7c, and is overlaid on battery element 2 including collector portion 3 and tab 4. Protective region 7d protects laminated films 5, 6 from battery element 2 and tab 4. Communication portion 7c is formed to allow the electrolyte to pass. More particularly, overlaying member 7 is overlaid on battery element 2, positive electrode collector portion 3a and negative electrode collector portion 3b and is overlaid on part of positive electrode tab 4a and negative electrode tab 4b, thereby protecting laminated films 5, 6 from these members. That is, protective region 7d covers areas which might damage laminated films 5, 6 by coming into contact with laminated films 5, 6, such as corners 2c and side surfaces 2b of battery element 2, corners 3c of collector portion 3 and corners 4c of tab 4 (see FIGS. 2D and 2E). Incidentally, corners refer to four corners of metal plates, such as a positive electrode plate, a negative electrode plate and tab, and portions in general which might easily damage laminated films 5, 6 by abutting against laminated films 5, 6, such as corner portions of cut surfaces of metal plates.

Overlaying member 7 is formed from a cylindrical film and has openings 7a, 7b at both ends thereof. The opening size of overlaying member 7 is not especially limited so long as the insertion of battery element 2 is easy. However, it is necessary that overlaying member 7 be caused to also exhibit the function of preventing battery element 2 from coming apart by wrapping battery element 2. Therefore, although it is necessary that the opening cross section of overlaying member 7 be larger than the cross section of battery element 2 on the side where collector portion 3 is formed, it is preferred that the size be such that battery element 2 does not come apart in overlaying member 7 after battery element 2 is overlaid with overlaying member 7.

Figure 4A:
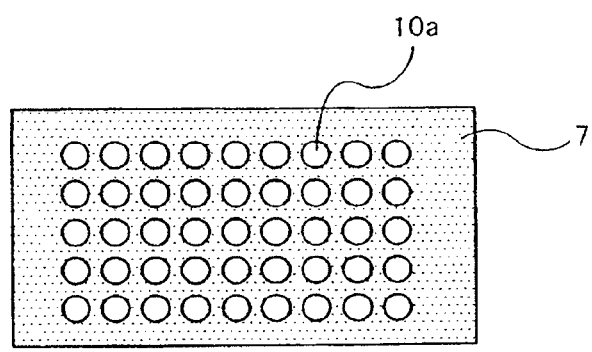
FIG. 4A is a schematic diagram showing an example of a communication portion.
Figure 4B:
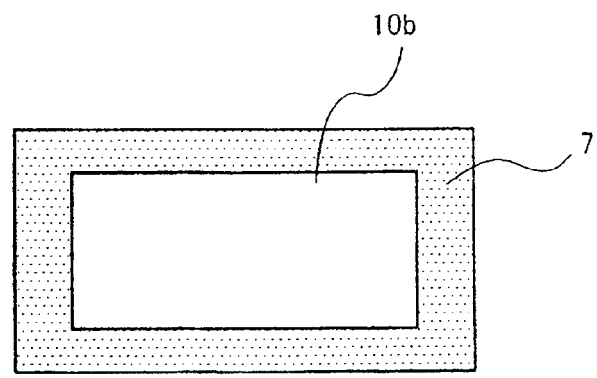
FIG. 4B is a schematic diagram showing another example of a communication portion.

As described above, overlaying member 7 comprises communication portion 7c through which the electrolyte can travel between the outer surface side and inner surface side of overlaying member 7. Although openings 7a, 7b function as communication portion 7c, any communication portion 7c is allowed so long as it permits travel of the electrolyte. For example, communication portion 7c may be a plurality of pores 10a as shown in FIG. 4A and may be a wide opening 10b as shown in FIG. 4B. Overlaying member 7 may also be formed from a porous member. Also in this case, the electrolyte can travel between the outer surface side and the inner surface side.

These plurality of pores 10a and opening 10b are not formed in positions corresponding to corners 2c and side surfaces 2b of battery element 2. Overlaying member 7 protects the covering film from corners 2c of battery element 2 by covering them, and prevents corners 2c of battery element 2 from damaging laminated films 5, 6 by touching them and causing poor insulation. However, if plurality of pores 10a and opening 10b are formed in positions corresponding to corners 2c of battery element 2, corners 2c corresponding to pores 10a and opening 10b become exposed, with the result that corners 2c may come into contact with laminated films 5, 6. If this occurs, it becomes impossible for overlaying member 7 to effectively exhibit the function of preventing poor insulation. Therefore, a plurality of pores 10a and opening 10b are not formed in positions corresponding to corners 2c and side surfaces 2b of battery element 2.

Length L1 of overlaying member 7 is longer than length L2 of battery element 2 including collector portion 3. It is preferred that length L1 is such that overlaying member 7, sealed with laminated films 5, 6, is overlaid on the stacked region of battery element 2 and on tab 4 present in collector portion 3 and in laminated films 5, 6, and does not enter sealing portion 8. That is, it is preferred that length L1 of overlaying member 7 is such that it prevents members formed by metal plates from coming into physical contact with laminated films 5, 6, and does not prevent sealing by thermal fusion. By adopting this length L1, it is possible for one overlaying member 7 to cover battery element 2 as well as all of positive electrode collector portion 3a and negative electrode collector portion 3b and both poles of positive electrode tab 4a and negative electrode tab 4b.

It is preferred that overlaying member 7 of this exemplary embodiment be made of PE (polyethylene), PP (polypropylene) and PET (polyethylene terephthalate). Because overlaying member 7 is formed from these materials, overlaying member 7 is rich in flexibility and even when a force is applied from the outside to positive electrode tab 4a and positive electrode tab 4a abuts against overlaying member 7, this abutted part will not be locally bent. The materials for overlaying member 7 are not limited to PE, PP or PET, but any material can be used so long as the material is not eroded by an electrolyte and is rich in flexibility. It is preferred that the thickness range of overlaying member 7 is from 0.03 mm or more to 0.2 mm or less.

It is preferred that the melting point of overlaying member 7 is equivalent to the melting point of laminated films 5, 6 or not more than this melting point in order to prevent laminated films 5, 6 from being damaged.

Examples of the electrolyte to be impregnated into battery element 2 include those obtained by dissolving salts consisting of cations of alkaline metal, such as Li, K and Na, and anions of compounds including halogens, such as $ClO_4^-$, $BF_4^-$, $PF_6^-$, $CF_3SO_3^-$, $(CF_3SO_2)_2N^-$, $(C_2F_5SO_2)_2N^-$, $(CF_3SO_2)_3C^-$ and $(C_2F_5SO_2)_3C^-$, in basic solvents having a high polarity capable of being used as electrolytic solutions of secondary batteries, such as ethylene carbonate, propylene carbonate, dimethyl carbonate, diethyl carbonate, methyl ethyl carbonate, γ-butyrolactone, N, N'-dimethyl formamide, dimethy sulfoxide, N-methyl pyrrolidone and m-cresol. Solvents and electrolytic salts consisting of these basic solvents can also be used singly or in a plurality of combinations. These may be polymer-gelled gelatinous electrolytes containing electrolytes. Sulfolane, dioxane, dioxolan, 1,3-propanesultone, tetrahydrofuran, vinylene carbonate and the like may be added in trace amounts to the electrolyte.

Next, the manufacturing method of film-covered battery 1 will be described with reference to FIGS. 2 and 3.

First, overlaying member 7 whose length L1 is larger than length L2 of battery element 2 including collector portion 3, is prepared. Overlaying member 7 may be formed by cutting a blown film into length L1. Pores 10a and opening 10b as communication portion 7c may be formed before cutting or may be formed after cutting. As described above, it is ensured that communication portion 7c is not formed in positions corresponding to corners 2c of battery element 2.

Subsequently, overlaying member 7 is overlaid on battery element 2 from tab 4 side. In FIG. 2A, overlaying member 7 is overlaid from negative electrode tab 4b side. However, as a matter of course, overlaying member 7 may be overlaid from positive electrode tab 4a side. As shown in FIG. 2B, overlaying member 7 and battery element 2 are aligned so that overlaying member 7 is located in a position where overlaying member 7 covers both positive electrode tab 4a and negative electrode tab 4b. In this state, naturally, positive electrode collector portion 3a and negative electrode collector portion 3b located between stacked region and tab 4 of battery element 2 are overlaid. Overlaying member 7 does not cover the whole area of tab 4. This is because the open end side of tab 4 is caused to extend from laminated films 5, 6. Therefore, overlaying member 7 covers tab 4 only up to the front side of the region where tab 4 is sealed with laminated films 5, 6.

In the alignment of overlaying member 7, it should be ensured that communication portion 7c is not arranged at corners 2c.

When overlaying member 7 is a mesh or a porous member, communication portion 7c becomes very fine and hence corners 2c will not be exposed. Therefore, when a mesh or a porous member is used as overlaying member 7, communication portion 7c may be positioned at corners 2c.

Because battery element 2 is composed of a plurality of positive electrode plates and negative electrode plates and separators, battery element 2 may sometimes come apart during handling before the stage of sealing with laminated films 5, 6. However, in the case of this exemplary embodiment, battery element 2 is fixed by being wrapped with overlaying member 7 as described above. For this reason, it is possible to carry out work without the need to pay attention to the coming apart or misaligning of battery element 2.

Even after completing assembly of a battery, in battery element 2, the positive electrode plates, negative electrode plates and separators may sometimes become relatively displaced within sealed laminated films 5, 6. If the positive electrode plates, negative electrode plates and separators become relatively displaced, it is impossible to obtain prescribed power generation characteristics. However, because in film-covered battery 1 of this exemplary embodiment, battery element 2 is fixed by overlaying member 7, it is possible to prevent the positive electrode plates, negative electrode plates and separators from becoming relatively displaced and hence it is possible to obtain prescribed power generation characteristics.

Figure 6:
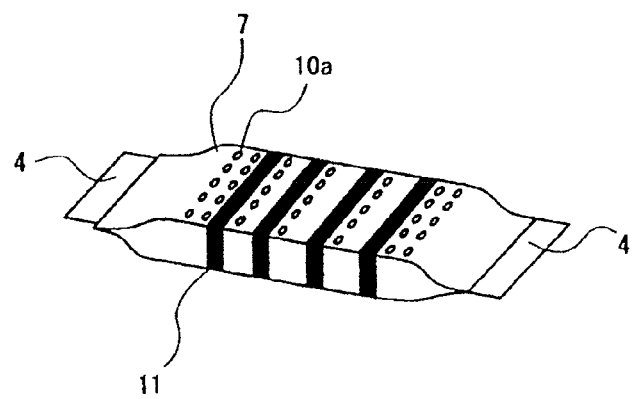
FIG. 6 is a perspective view of a battery element which is further fixed with a shrink tape or a heat shrinkable tube from upon an overlaying member.

As shown in FIG. 6, battery element 2 may be further covered with a shrink tape or heat shrinkable tube 11 from upon overlaying member 7. By causing the shrink tape or heat shrinkable tube 11 to shrink after heating, fixing of battery element 2 with overlaying member 7 becomes more secure and it is possible to more securely prevent battery element 2 from coming apart. When for example a plurality of pores 10a are formed as communication pores 7c in overlaying member 7, it is preferred that the shrink tape or heat shrinkable tube 11 be arranged in positions where the shrink tape or heat shrinkable tube 11 does not overlap pores 10a so as not to impede the passage of electrolyte.

Subsequently, as shown in FIG. 2C, battery element 2 overlaid with overlaying member 7 is sandwiched with laminated films 5, 6. Positive electrode tab 4a is caused to extend outward from the sealing portion 8a side, and negative electrode tab 4b is caused to extend outward from the sealing portion 8b side. After that, the four sides of sealing portions 8a, 8b and two sealing portions 8c are thermally fused and an electrolyte is sealed in. This step will be described in further detail. First, sealing portions 8a, 8b and only one of two sealing portions 8c are thermally fused, whereby laminated films 5, 6 are formed in the shape of a sack. Next, electrolyte is poured into this sack and sealing portion 8c which remains last is thermally fused. The sealing step is completed in this way.

Figure 1B:
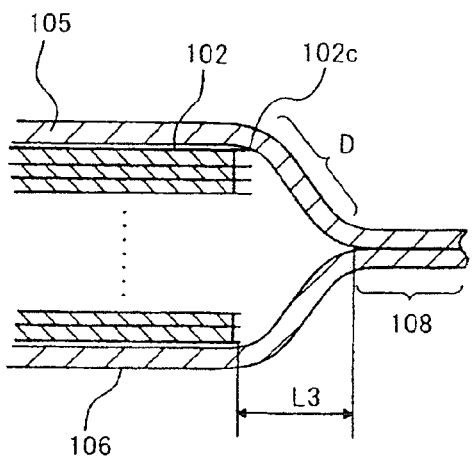
FIG. 1B is a partial sectional view along Line C-C in FIG. 1A.
Figure 1C:
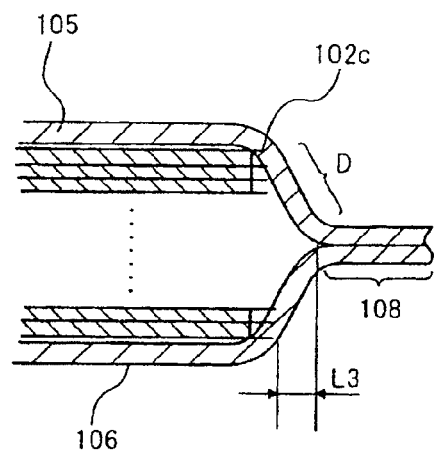
FIG. 1C is a partial sectional view along Line C-C in FIG. 1A and shows an example in which the clearance L3 is reduced.

At this time, clearance L3 between overlaying member 7 positioned on side surface 2b of battery element 2 and the inner side of sealing portion 8c can be in the range of 0 mm to 3 mm. Conventionally, it has been necessary that this clearance L3 be at least 3 mm (see FIGS. 1B and 1C). The reason for this is as follows.

When sealing portion 108c is heated by use of a heater in order to thermally fuse sealing portion 108c, the heat is conducted to laminated films 105, 106. When the thermally-fusible resin layers of laminated films 105, 106 in this region D covering the areas in the vicinity of corners 102c of battery element 102 have softened due to the heat, corners 102c of battery element 102 may sometimes break through the thermally-fusible resin layers. Then, corners 102c which have broken through thermally-fusible resin layers reach the metal layers of laminated films 105, 106. As a result, the metal layers become exposed and the electrolyte comes into direct contact with the metal layers, sometimes causing poor insulation. Therefore, in order to ensure insulating properties, clearance L3 of at least 3 mm has hitherto been provided so that the heat of sealing portion 108c is not easily conducted to region D.

Laminate-covered batteries for small electron equipment have come into widespread use. However, such as for power applications in automobiles, when high voltage is obtained by connecting a large number of batteries in series, insulating properties become important. For this reason, it is necessary to take measures to prevent corners 2c from damaging the inner surface layers of laminated films and from reaching the metal layers in the laminated films so as to prevent development of cracks and the like. For this purpose, clearance L3 of 3 mm or more has thitherto been provided in the electrode laminates and sealing portions.

However, clearance L3 provided to avoid these problems has reduced volume density.

In this exemplary embodiment, corners 2c of battery element 2 are overlaid with overlaying member 7. As a result, protective layers are present between corners 2c and laminated films 5, 6. The protective layers have a buffer action on acute corners 2c. That is, even when clearance L3 is set at 0 mm to 3 mm, the presence of the protective layers makes it possible to avoid the situation in which corners 2c abut against the thermally-fusible resin layers of laminated films 5, 6 and damage the thermally-fusible resin layers. This results in the fact that the deterioration of insulating properties of the laminated films is prevented. In this exemplary embodiment, it is possible to improve volume density compared to the related art by just the amount corresponding to a decrease in clearance L3.

In overlaying member 7 of this exemplary embodiment, it is possible to cover not only corners 2c of battery element 2, but also collector portion 3, corners 3c of collector portion 3 and corners 4c of tab 4. Furthermore, overlaying member 7 can cover also bond part between collector portion 3 and tab 4. For this reason, it is possible to prevent these members from damaging laminated films 5, 6.

Because overlaying member 7 of this exemplary embodiment has communication portion 7c, it is possible to shorten the time required by the infiltration of electrolyte into the separators. Because basically overlaying member 7 is a cylindrical member, electrolyte can flow from openings 7a, 7b to the side of battery element 2. However, electrolyte is less apt to flow behind into openings 7a, 7b in a condition that sealed with laminated films 5, 6. In particular, on the side of sealing portion 8c which has been thermally fused at the beginning, electrolyte is less apt to flow behind. However, overlaying member 7 of this exemplary embodiment has communication portion 7c. For this reason, it is possible to cause the electrolyte to flow toward the battery element 2 after passing through communication portion 7c. As a result, according to the present invention, it is possible to shorten the time that is needed for the electrolyte to penetrate the separators.

Because communication portion 7c is not provided in positions corresponding to corners 2c, corners 2c of battery element 2 will not damage laminated films 5, 6 by being exposed.

As described above, overlaying member 7 of this exemplary embodiment covers areas which are apt to damage laminated films 5, 6, such as battery element 2, collector portion 3 and corners 2c, 3c, 4c of tab 4, with protective region 7d. As a result, in the present invention, it is possible to avoid the situation in which region D of sealing portion 8, which has become soft due to heat, and thermally-fusible resin layers of laminated films 5, 6 in the vicinity of corners 2c, 3c, 4c, are damaged by the abutment of these corners 2c, 3c, 4c, resulting in worsened insulating properties of laminated films 5, 6.

Because overlaying member 7 provides protective layers between corners 2c, 3c, 4c and laminated films 5, 6, it is possible to make clearance L3 zero by bringing overlaying member 7 positioned on side surface 2b of battery element 2 into substantially close contact with the inner side of sealing portion 8c. Because of this, in the present invention, it is possible to miniaturize a battery. As a result, it is possible to improve the capacity density of the battery.

Overlaying member 7 of this exemplary embodiment fixes battery element 2 by wrapping it. For this reason, according to the present invention, it is possible to prevent a plurality of positive electrode plates, negative electrode plates and separators which constitute battery element 2 from coming apart during manufacture, and the manufacturing of batteries becomes easy. Furthermore, in the present invention, even in a completed battery, it is possible to prevent the relative displacement of positive electrode plates, negative electrode plates and separators in the interior of the battery. Therefore, the battery of the present invention realizes the prescribed power generation characteristics by securing the prescribed contact area between the positive electrode plates, separators, and negative electrode plates.

Because overlaying member 7 of this exemplary embodiment has communication portion 7c, it is possible to shorten the time required by infiltration of the electrolyte.

In this exemplary embodiment, by using one overlaying member 7, it is possible to prevent the battery element from coming apart and also to prevent damage on both the positive and negative electrode sides, with the result that the number of parts can be reduced.

Second Exemplary Embodiment

In the first exemplary embodiment, the case where two laminated films are used was shown. In this exemplary embodiment, a description will be given of overlaying member 27 to be used when one sheet of laminated film is folded into a sack shape. In the description of this exemplary embodiment, for the sake of simplicity, the same members as in the first exemplary embodiment are described with the aid of the same reference numerals.

Figure 5A:
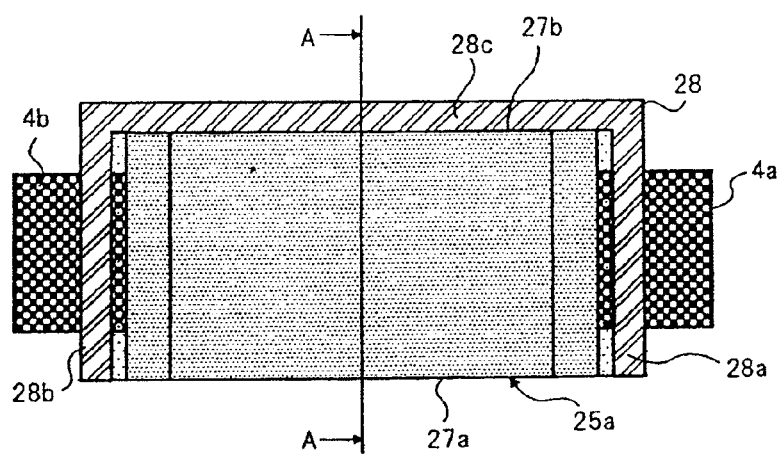
FIG. 5A is a perspective view of a film-covered battery in a second exemplary embodiment.
Figure 5B:
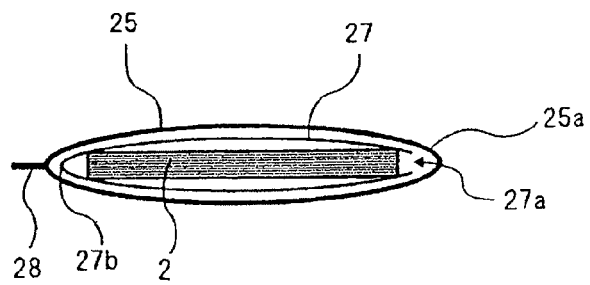
FIG. 5B is a sectional view along Line A-A in FIG. 5A.

FIG. 5A shows a perspective view of a film-covered battery in this exemplary embodiment, and FIG. 5B is a sectional view along Line A-A in FIG. 5A.

In the film-covered battery of this exemplary embodiment, one sheet of laminated film 25 is folded twofold at folded-back end 25a to sandwich battery element 5 and the open three sides are thermally fused, whereby battery element 5 is sealed. That is, folded-back end 25a does not need to be thermally fused and hence it is enough to thermally fuse sealing portions 8a, 8b and one sealing portion 3c. In the case of this configuration, as shown in FIG. 5B, overlaying member 7 has a construction of one sheet of film which is folded twofold instead of a cylindrical shape, and it is possible to ensure that open portion 27a on the side opposed to bent portion 27b of overlaying member 27 is positioned on the side of folded-back end 25a. This is because it is unnecessary to cover side surfaces 2b of battery element 2 with overlaying member 27 since measures against heat are unnecessary for folded-back end 25a, which is not thermally fused. In this case, it is possible to cause open portion 27a to function as communication portion 7c, and hence no pore may be formed as communication portion 7c on the main surface of overlaying member 27. Of course, by forming pores in the main surface, it is possible to further shorten the time that is needed for the electrolyte to penetrate.

Although open portion 27a of overlaying member 27 doses not cover the whole area of side surfaces 2b of battery element 2, it is necessary that open portion 27a of overlaying member 27 covers at least corners 2c of battery element 2, corners 3c of collector portion 3 and corners 4C of tab 4.

Although the present invention was described above by referring to the exemplary embodiments, the present invention is not limited to the above-described exemplary embodiments. The configurations and details of the present invention can be subject to various modifications which those skilled in the art can understand in the scope of the present invention.

This application is based upon and claims benefit of priority from the Japanese Patent Application No. 2008-066478, filed on Mar. 14, 2008, the entire contents of which are incorporated herein by reference.

The invention claimed is:

1. An overlaying member which is used in a film-covered electrical device comprising an electrical device element, a stacked region, alternately stacking positive electrode plates and negative electrode plates, and a collector region collectively bonding each of the positive electrode plates and the negative electrode plates, which extend outward from the stacked region; a covering film including at least a thermally-fusible resin layer and a metal layer are stacked and which encloses the electrical device element, with the thermally-fusible resin layer disposed inside, and which seals the electrical device element and an electrolyte by thermally fusing a sealing portion at a peripheral edge; and a tab connected to the collector region and extending outward from the covering film, the overlaying member comprising:

a protective region located between the electrical device element and the covering film, which covers corners of the electrical device element and corners of the tab; and a communication portion through which the electrolyte can pass, wherein the protective region comprises:

a bent portion covering a whole area of the side surface of the electrical device element; and an opening portion which is on an opposite side of the bent portion.

2. The overlaying member according to claim 1, wherein the communication portion includes pores formed in positions corresponding to main surfaces of the electrodes.

3. The overlaying member according to claim 1, wherein the overlaying member is a porous sheet.

4. The overlaying member according to claim 1, wherein the overlaying member is a cylindrical film.

5. A film-covered electrical device, comprising:

an electrical device element, a stacked region, alternately stacking positive electrode plates and negative electrode plates, and a collector region collectively bonding each of the positive electrode plates and negative electrode plates, which extend outward from the stacked region;

a covering film including at least a thermally-fusible resin layer and a metal layer are stacked and which encloses the electrical device element, with the thermally-fusible resin layer disposed inside, and which seals the electrical device element and an electrolyte by thermally fusing a sealing portion at a peripheral edge;

a tab is connected to the collector region and extending outward from the covering film; and an overlaying member comprising:

a protective region located between the electrical device element and the covering film, which covers corners of the electrical device element and corners of the tab; and a communication portion through which the electrolyte can pass, wherein the protective region comprises:

a bent portion covering a whole area of the side surface of the electrical device element; and an opening portion which is on an opposite side of the bent portion.

6. A film-covered electrical device, comprising:

an electrical device element, a stacked region, alternately stacking positive electrode plates and negative electrode plates, and a collector region collectively bonding each of the positive electrode plates and negative electrode plates, which extend outward from the stacked region;

a covering film including at least a thermally-fusible resin layer and a metal layer are stacked and which encloses the electrical device element, with the thermally-fusible resin layer disposed inside, and which seals the electrical device element and an electrolyte by thermally fusing a sealing portion at a peripheral edge;

a tab connected to the collector region and extending outward from the covering film; and an overlaying member comprising:

a protective region located between the electrical device element and the covering film, which covers corners of the electrical device element and corners of the tab; and a communication portion through which the electrolyte can pass, wherein the protective region comprises:

a bent portion covering a whole area of the side surface of the electrical device element; and an opening portion which is on an opposite side of the bent portion, wherein the covering film, which is one sheet of film material folded twofold, sandwiches the electrical device element overlaid with the overlaying member, and seals the electrical device element by thermally fusing open sides, and wherein the opening portion is positioned on a fold line side of the covering film.

7. The film-covered electrical device according to claim 5, wherein the overlaying member positioned on a side surface of the electrical device element and the covering film are substantially close to each other.

8. The film-covered electrical device according to claim 5, wherein the overlaying member is fixed to the electrical device element by a shrink tape or a heat shrinkable tube.

9. The film-covered electrical device according to claim 5, wherein a clearance between the protective region and the sealing portion is less than or equal to 3 mm.

10. The film-covered electrical device according to claim 6, wherein a clearance between the protective region and the sealing portion is less than or equal to 3 mm.

11. The overlaying member according to claim 1, wherein a material of the overlaying member is polyethylene, polypropylene or polyethylene terephthalate, and wherein a material of the thermally-fusible resin layer is polypropylene, polyethylene, acid denatured substances of polypropylene and polyethylene, polyphenylene sulfides, polyester, polyamide or ethylene-vinyl acetate copolymers.

12. The overlaying member according to claim 1, wherein a thickness of the overlaying member is not less than 0.03 mm and not more than 0.2 mm.

* * * * *